United States Patent [19]

Stocco et al.

[11] Patent Number: 4,516,765
[45] Date of Patent: May 14, 1985

[54] ROTARY PICK AND PLACEMENT MACHINE

[75] Inventors: Sam Stocco, Brooklyn Park; Stanley Davis, Maple Grove, both of Minn.

[73] Assignee: Thiele Engineering Company, Minneapolis, Minn.

[21] Appl. No.: 441,781

[22] Filed: Nov. 15, 1982

[51] Int. Cl.³ .............................................. B65H 3/12
[52] U.S. Cl. .................................... 271/95; 271/107; 271/31.1
[58] Field of Search ................ 271/95, 102, 107, 30 A

[56] References Cited

U.S. PATENT DOCUMENTS 3,302,946 2/1967 Anderson .............................. 271/95
3,575,409 4/1971 Calvert .................................. 271/95

Primary Examiner—Richard A. Schacher
Attorney, Agent, or Firm—Fitch, Even, Tabin & Flannery

[57] ABSTRACT

A pick and placement machine particularly adapted to pick off and place deep drawn trays or the like. The machine includes rotating suction means which dips into a station and picks off a tray or places a tray, the suction means moving in a radial direction and in a substantially straight line at the station. Means are provided for effecting such motion of the suction means.

4 Claims, 5 Drawing Figures

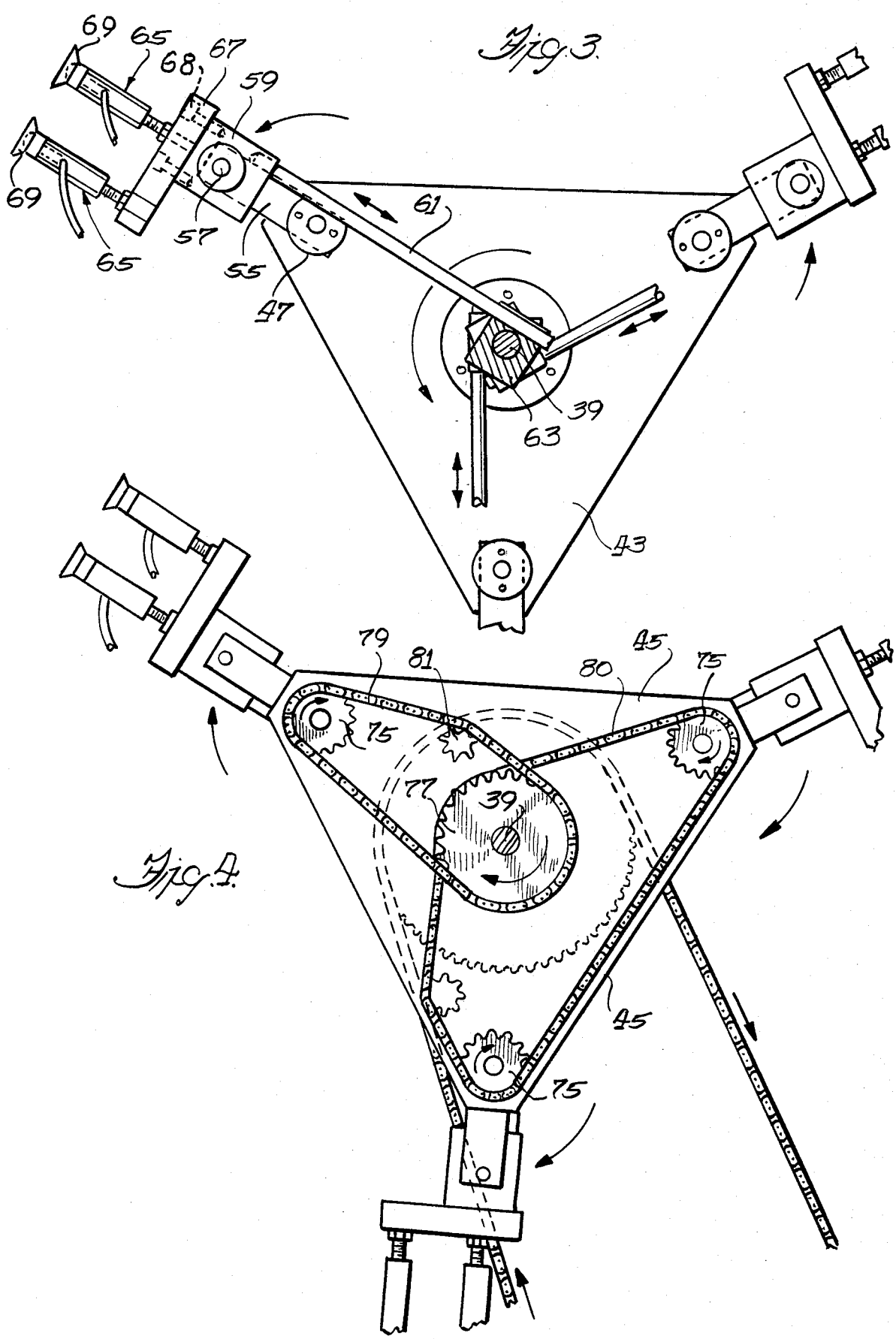

ROTARY PICK AND PLACEMENT MACHINE

BACKGROUND OF THE INVENTION

The present invention relates generally to a rotary machine for picking off a tray, or the like, and placing it at a circumferentially spaced position, and more particularly, the invention relates to a rotary picking off and placement machine which is particularly adapted to pick off deeper drawn trays than heretofore possible and delivering them to one or more circumferentially spaced positions.

Rotary placers for picking off flat sheets, and the like, and rotating them to delivery positions which are circumferentially spaced from the supply of the sheets are well known in the art. A particular example of such machines is disclosed in U.S. Pat. No. 3,302,946 to Anderson and entitled, "Rotary Coupon Placer". As disclosed in that patent, coupons, in the form of flat sheets, are picked up from a coupon supply hopper by means of a vacuum cup and delivered to a second position whereat the coupon is deposited into a carton. Upon picking off a coupon, as shown in the patent, the coupon is rotated about a shaft which, in turn, is rotated about a drive shaft. Thus, the coupon is subjected to rotation about two axes and the suction cup slides into position along an arc. This machine is quite successful in picking up and placing thin articles, such as the coupons illustrated.

However the machine is inadequate when a dipping action is desired to pick up and handle the article, which action is necessary in order to successfully handle deep drawn articles such as trays, or the like. Further, the machine is inadequate for successfully attaching a sheet into the bottom of a tray, or the like. This deficiency is characteristic of other rotary pick and place machines in the marketplace.

In order to successfully pick off deep drawn articles, as distinguished from flat sheets or the like, it would be desirable to cause the suction cups to dip into the article by substantially perpendicular movement relative to the article at the supply station and to deliver the article to a second station whereat the machine can again dip the article toward a sheet or the like to be glued onto the article. Further, it would be desired to use a dipping movement and deliver the article to a placement station. The dipping action at such station can facilitate collection of the articles. Known pick and place machines do not provide this dipping action, but rather, cause the pick off means to sweep onto the face of the article along an arc, remove it from a supply station and sweep it into a circumferentially spaced station.

It is an object of the invention to provide an improved rotary pick and placement machine for picking off articles and delivering them in a circumferentially spaced position.

A further object of the invention is to provide a pick and placement machine which can effectively pick off deep drawn articles by means of a dipping action which causes the pick off means to move generally radially into an article at a station and to radially discharge the article at a circumferentially spaced placement station.

It is a still further object of the invention to be able to move a suction cup or the like radially toward and away from articles in a loading station and to move such articles radially toward and away from a second station whereat the article may be acted upon and deliver the article to a third station by like radial in and out motion.

SUMMARY OF THE INVENTION

The present invention is directed to a machine for picking off articles from a supply station and delivering the articles to one or more circumferentially spaced stations. A particular feature of the invention is the generally straight line, in-and-out, motion for causing a suction cup of the like to move radially into and out of the station with minor arcuate movement at the station. Thus, the suction cup moves substantially radially at the respective stations to effect the desired operation of the machine. By reason of this particular movement of the suction cup, a deep drawn tray or the like can be effectively lifted away from a stack or supply of trays and also can be pressed against a sheet with adhesive thereon without significant wiping action.

More particularly, the machine of the invention includes a shaft which is driven and on which is carried a rod which moves radially relative to the drive shaft. The rod is connected to a second shaft which is rotary driven to cause the rod to move in and out radially. The second shaft is further connected by a crank to suction cups which effect picking and placement of trays or the like. Thus, the suction cups are rotated around the driven axis and are likewise rotated about a shaft which is radially spaced from the driven shaft so that the suction cups effect a dipping action at the stations which are circumferentially spaced. The movement of the suction cups is typified schematically in FIG. 5 of the drawings which shows the suction cups picking off a tray at a loading station and moving it to a second station, with subsequent delivery of the tray to a placement station. FIG. 5 well illustrates the substantial radial movement in a generally straight line at the respective stations.

The action of the suction cups at the respective stations to effect the desired substantially straight line movement is new to rotary pick and placement machines and provides an unusual and new result for such machines, making such machines adaptable to additional operations.

BRIEF DESCRIPTION OF THE DRAWINGS

FIG. 3 is a partial side view more particularly illustrating the mechanism for supporting and moving the suction cups.

FIG. 4 is a view from the opposite side to that shown in FIG. 3 illustrating the drive arrangement for causing the suction cups to operate in the desired manner.

DETAILED DESCRIPTION OF A PREFERRED EMBODIMENT OF THE INVENTION

Figure 1:
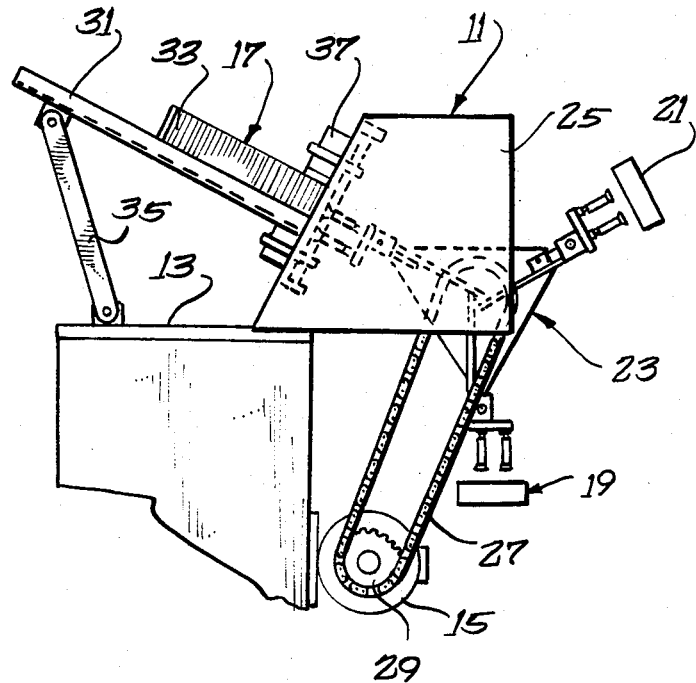
FIG. 1 is a partial side view of the machine of the invention disclosing suction cups for picking off and placing trays which are deep drawn.

The machine 11 of the invention generally includes a frame 13 on which is mounted a motor 15 for driving purposes. As shown in FIG. 1, the machine 11 is associated with a loading station 17, a second station 19 at which a glued sheet may be applied, and a placement station 21. A rotary mechanism 23 of the invention is journalled onto transversely spaced plates 25, the plates 25 being mounted on the frame 13. The rotary mechanism 23 is driven by means of a chain 27 which is trained around a sprocket 29 mounted on the shaft of the motor 15.

The loading station 17 includes a chute 31 on which may be carried a pack of trays 33 available for loading onto the rotary mechanism 23. The chute is held in position by means of a bracket 35 connected between the chute 31 and frame 13 to properly position the trays 33 relative to the rotary mechanism 23. The chute 31 is bolted to the plates 25 by means of a bracket 37.

The rotary mechanism 23 is carried upon a drive shaft 39 which is driven by a chain 27 from the motor 15 by means of a sprocket 41. The drive shaft 39 is fixedly connected to a pair of transversely spaced triangular plates 43 and 45, particularly shown in FIGS. 3 and 4. Thus, the drive shaft 39 rotates the plates 43 and 45.

Figure 2:
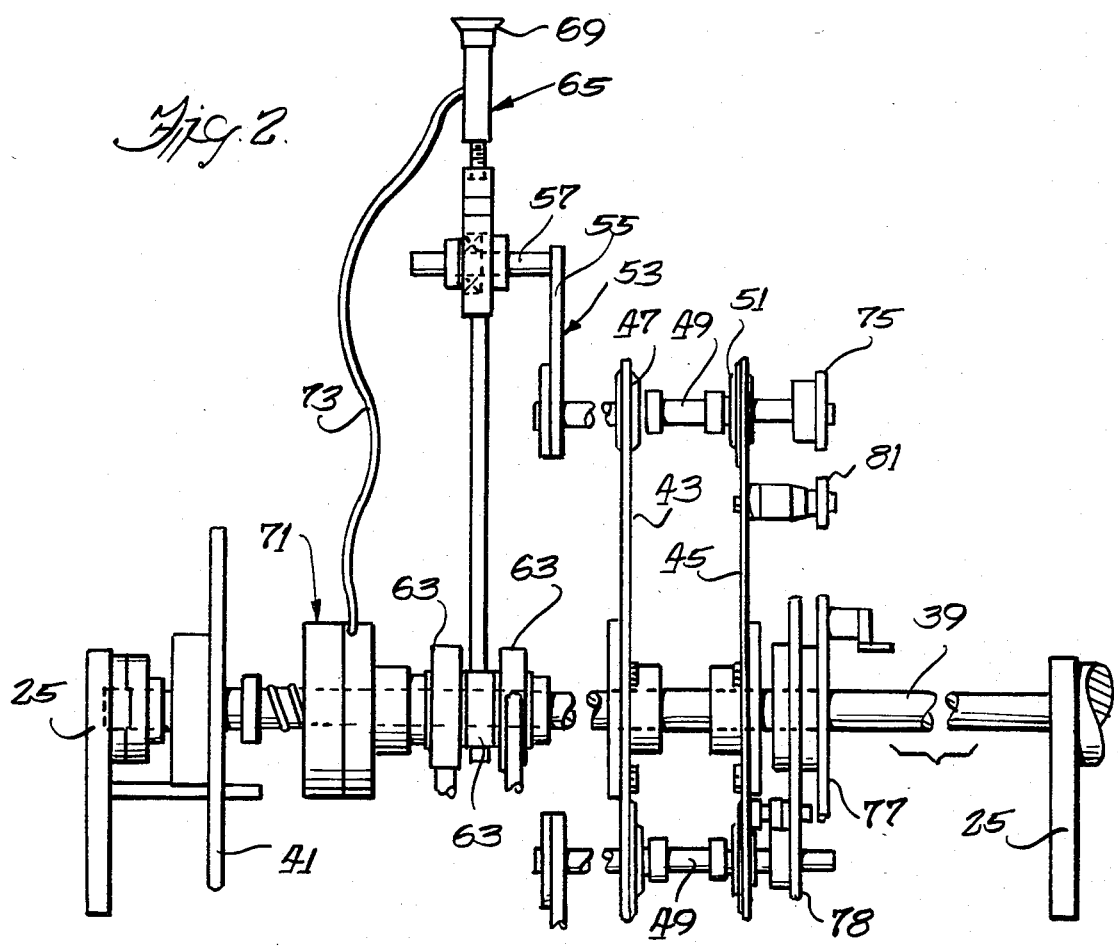
FIG. 2 is a partial end view of the rotary mechanism of the machine shown in FIG. 1 for providing dipping movement of the suction cups at various stations.

Now particularly referring to FIGS. 2 and 3, the triangular plate 43 carries bearings 47 at each of the corners of the triangular plate 43 through which extends a shaft 49, this shaft 49 also being journalled in bearings 51 located at the corners of the transversely spaced triangular plate 45. The shaft 49 is connected to a crank 53 comprising an arm 55 which rotates a handle 57 connected to a mounting block 59, thereby moving the block 59 by rotation of the crank 53. The mounting block 59 is threadedly connected to a radially extending rod 61 which extends into a bearing block 63 fixedly connected to the drive shaft 39. Thus, as the crank 53 is rotated, the rod 61 moves radially inwardly and outwardly, relative to the shaft 39, in the block 63 which is provided with a bearing (not shown). Suction means 65 are connected to the mounting block 59 by means of a mounting plate 67 and screws 68. The suction means 65 includes suction cups 69 and vacuum supply means 71 which connects to the cups 69 by means of a tube 73. A vacuum to the cups 69 is controlled by the vacuum supply means 71 in a conventional manner to provide suction at desired times during the operation of the machine 11. The means of controlling vacuum to the cups 69 is not believed to be new and will not be further described herein.

The plate 45 mounts a plurality of gear sprockets which are connected to the crank 53 through the shaft 49. The sprockets 75 are driven by sprockets 77 and 78 and chains 79 and 80. The sprockets 77 and 78 are connected to the drive shaft 39 so that upon rotation of the rotary mechanism 23 the sprockets 75 are rotated. Tension sprockets 81 and 82 are mounted upon the plate 45 to properly tension the chains 79 and 80, respectively.

The crank arms 55 are in their fully extended radial position at the stations 17, 19 and 21. This is important to achieve the desired substantially straight line movement at the stations.

Figure 5:
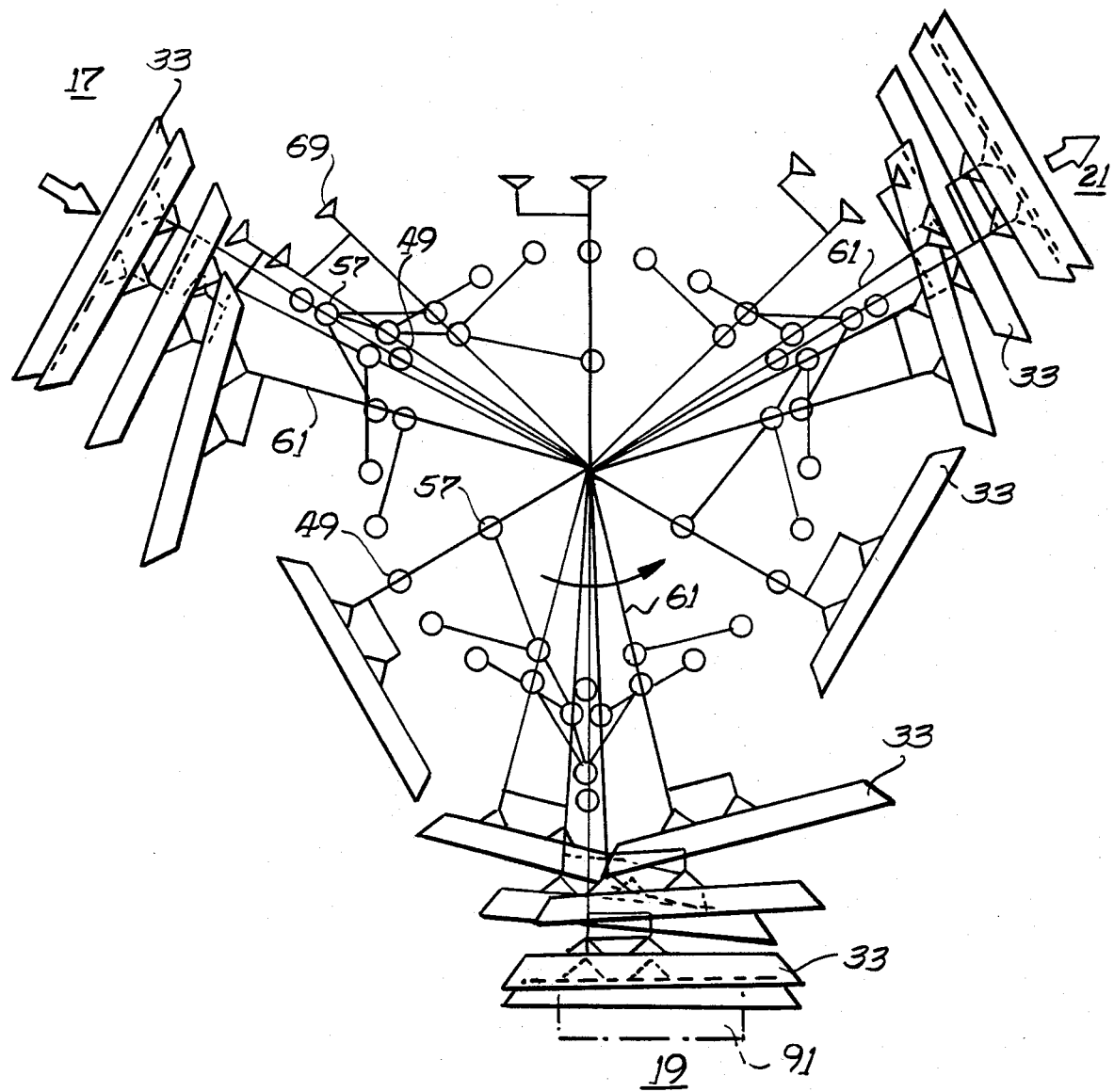
FIG. 5 is a schematic view illustrating various positions and movement of the suction cups while carrying a tray.

Now referring to FIG. 5, the movement of the suction cups 69 is schematically illustrated and the various positions of the handle 57 and the shaft 49 are illustrated. The trays 33 are shown on the suction cups at various positions. It will be seen that the handle 57 is moving slowly in a generally radial direction at the stations and its movement is moving much more rapidly intermediate the stations. Thus, the suction cups 69 dip into the trays 33 and pick them from the stack of trays in the loading station 17. At the second station 19, the movement of the trays is also slow in a radial direction and, in the illustrated embodiment, the tray 33 at the second station is pressed against a stack 91 of liner sheets and picks up a pre-glued liner sheet which is attached to the bottom of the tray. The suction cups 69 then deliver the tray to the placement station 21 by like motion at the other stations. This facilitates stacking of the trays 33 at the placement station 21.

In operation of the pick and place machine 11, the motor 15 is operated causing the chain 27 to be driven and the rotary mechanism 23 to be rotated on the shaft 39. The vacuum means 71 provides vacuum to the suction cups 69 located at the loading station 17 and rotation causes the cups to move radially in a substantially straight line and to pick a tray 33 from the stack in the loading station 17. This is accomplished by means of the crank 53 slowly moving away from its extended position and causing the rod 61 to move radially inwardly. The crank 53 continues to rotate and move the rod 61 radially inwardly in the bearing block 63. Vacuum is maintained on the cups 69 and, as shown in FIG. 5, the tray is next pressed against the stack of liner sheets 91 at the second station 19 with the crank 53 extending itself and moving the tray substantially in a straight line against the stack. Continued motion of the rotary mechanism 23 causes the tray to move in a straight line away from the station 19. The tray, with the suction being maintained by the vacuum means 71, moves to the placement station 21 and the tray 33 is stacked by the straight line motion at the placement station.

As shown in the drawings, three sets of suction cups 69 are similarly mounted and operated by the rotary mechanism 23 and like numbers have been applied to like parts. It will also be understood that several stations may be transversely spaced in the machine 11 with associated rotary mechanisms 23.

The various features of the invention which are believed to be new are set forth in the following claims.

What is claimed is:

1. A pick and placement machine comprising a drive shaft, a radially extending rod on said drive shaft movable inwardly and outwardly relative to said drive shaft, a continuously rotating crank connected to the outer end of said rod and journalled outwardly of said drive shaft, the crank effecting inward and outward movement of said rod, suction means on the outer end of said rod, and means connected between said drive shaft and said crank to effect rotation therof.

2. A machine in accordance with claim 1 further including a plate on said drive shaft and a journal on said plate for said crank.

3. A machine in accordance with claim 1 in combination with a station adjacent the machine, locating said crank in a fully extended position relative to said drive shaft at said station.

4. A machine in accordance with claim 1 further comprising a plate on said drive shaft, a journal on said plate receiving a shaft connected to said crank, sprockets on said crank shaft and on said drive shaft interconnected by a chain whereby said crank is continuously rotated, and a bearing block on said drive shaft for receiving the inner end of said rod.

* * * * *